(12) United States Patent
Talasila et al.

(10) Patent No.: US 12,452,828 B2
(45) Date of Patent: Oct. 21, 2025

(54) INDOOR PLACE PREDICTION

(71) Applicants: AT&T Intellectual Property I, L.P., Atlanta, NJ (US); New Jersey Institute of Technology, Newark, NJ (US)

(72) Inventors: Manoop Talasila, Branchburg, NJ (US); Qiong Wu, Bridgewater, NJ (US); Wen-Ling Hsu, Bridgewater, NJ (US); Xiaopeng Jiang, Kearny, NJ (US); Cristian Borcea, Hillsborough, NJ (US); Pritam Sen, Harrison, NJ (US)

(73) Assignees: AT&T Intellectual Property I, L.P., Atlanta, GA (US); New Jersey Institute of Technology, Newark, NJ (US)

( * ) Notice: Subject to any disclaimer, the term of this patent is extended or adjusted under 35 U.S.C. 154(b) by 449 days.

(21) Appl. No.: 18/046,129

(22) Filed: Oct. 12, 2022

(65) Prior Publication Data
US 2024/0129889 A1    Apr. 18, 2024

(51) Int. Cl.
*H04W 64/00* (2009.01)
*G01C 21/20* (2006.01)

(52) U.S. Cl.
CPC ........ *H04W 64/006* (2013.01); *G01C 21/206* (2013.01)

(58) Field of Classification Search
CPC ....... H04W 64/00; H04W 4/02; H04W 4/029; H04W 4/025; H04W 64/003; H04W 76/50; H04W 12/63
See application file for complete search history.

(56) References Cited

U.S. PATENT DOCUMENTS

| | | | |
|---|---|---|---|
| 2022/0026519 A1* | 1/2022 | Wu | G01S 7/006 |
| 2024/0094006 A1* | 3/2024 | Chen | G07C 9/00571 |

* cited by examiner

*Primary Examiner* — Kwasi Karikari

(57) ABSTRACT

For example, a method includes collecting orientation data from a mobile device as a user of the mobile device moves within an indoor space, generating orientation estimates for the mobile device from the orientation data, generating distance estimates representing distances of the mobile device to a wireless access point in the indoor space, storing the orientation estimates and the distance estimates together as a series of data blocks, constructing a plurality of trajectory segments from the orientation estimates, identifying identifiers for a last number of trajectory segments, using data blocks corresponding to the last number of trajectory segments, and identifying a predicted place within the indoor space to which the user is expected to go by using the identifiers to traverse a prediction tree, where branches of the prediction tree that are associated with the identifiers define a path that ends at a leaf node corresponding to the predicted place.

20 Claims, 4 Drawing Sheets

INDOOR PLACE PREDICTION

The present disclosure relates generally to wireless technology, and relates more particularly to devices, non-transitory computer-readable media, and methods for predicting a mobile user's place when the mobile user is in an indoor space.

BACKGROUND

Technology for tracking the places of mobile users (i.e., users of mobile devices, such as mobile phones, tablet computers, wearable devices, and the like) has improved greatly in recent years. For instance, technology such as global positioning systems (GPS) allows mobile users to be tracked in outdoor locations with high accuracy and low latency.

SUMMARY

In one example, the present disclosure describes a device, computer-readable medium, and method for predicting a mobile user's location when the mobile user is in an indoor space. For instance, in one example, a method performed by a processing system including at least one processor includes collecting orientation data from a mobile device as a user of the mobile device moves within an indoor space, generating orientation estimates for the mobile device from the orientation data, generating distance estimates representing distances of the mobile device to a wireless access point in the indoor space, simultaneously with generating the orientation estimates, storing the orientation estimates and the distance estimates together as a series of data blocks, constructing a plurality of trajectory segments from the orientation estimates, identifying identifiers for a last number (e.g., last n) of trajectory segments of the plurality of trajectory segments, using a subset of the series of data blocks corresponding to the last number of trajectory segments, and identifying a predicted place within the indoor space to which the user is expected to go by using the identifiers to traverse a prediction tree, where branches of the prediction tree that are associated with the identifiers define a path that ends at a leaf node of the prediction tree that corresponds to the predicted place.

In another example, a non-transitory computer-readable medium stores instructions which, when executed by a processing system including at least one processor, cause the processing system to perform operations. The operations include collecting orientation data from a mobile device as a user of the mobile device moves within an indoor space, generating orientation estimates for the mobile device from the orientation data, generating distance estimates representing distances of the mobile device to a wireless access point in the indoor space, simultaneously with generating the orientation estimates, storing the orientation estimates and the distance estimates together as a series of data blocks, constructing a plurality of trajectory segments from the orientation estimates, identifying identifiers for a last number (e.g., last n) of trajectory segments of the plurality of trajectory segments, using a subset of the series of data blocks corresponding to the last number of trajectory segments, and identifying a predicted place within the indoor space to which the user is expected to go by using the identifiers to traverse a prediction tree, where branches of the prediction tree that are associated with the identifiers define a path that ends at a leaf node of the prediction tree that corresponds to the predicted place.

In another example, a system includes a processing system including at least one processor and a non-transitory computer-readable medium storing instructions which, when executed by the processing system, cause the processing system to perform operations. The operations include collecting orientation data from a mobile device as a user of the mobile device moves within an indoor space, generating orientation estimates for the mobile device from the orientation data, generating distance estimates representing distances of the mobile device to a wireless access point in the indoor space, simultaneously with generating the orientation estimates, storing the orientation estimates and the distance estimates together as a series of data blocks, constructing a plurality of trajectory segments from the orientation estimates, identifying identifiers for a last number (e.g., a last n) of trajectory segments of the plurality of trajectory segments, using a subset of the series of data blocks corresponding to the last number of trajectory segments, and identifying a predicted place within the indoor space to which the user is expected to go by using the identifiers to traverse a prediction tree, where branches of the prediction tree that are associated with the identifiers define a path that ends at a leaf node of the prediction tree that corresponds to the predicted place.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
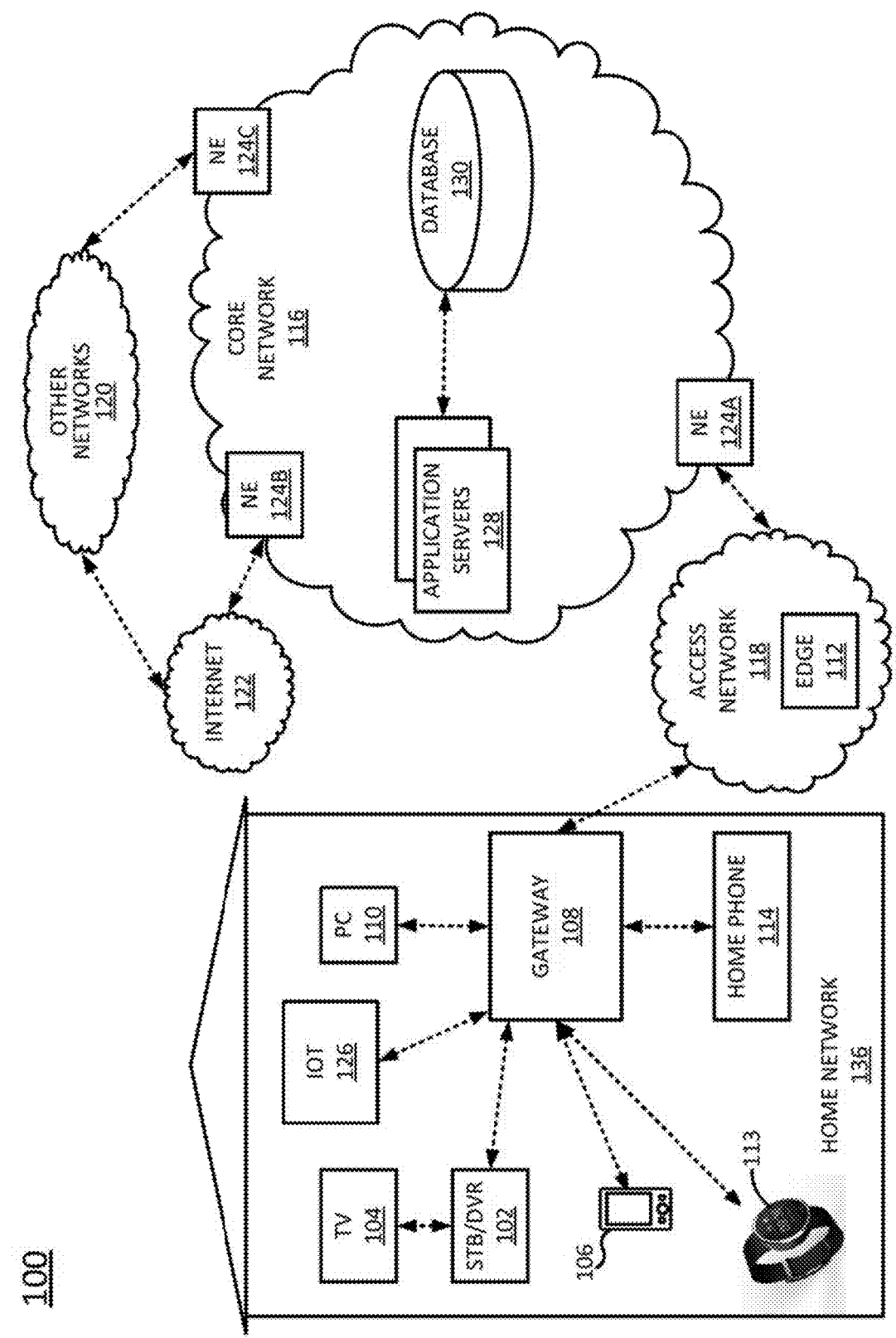
FIG. 1 illustrates an example system related to the present disclosure.

In one example, the present disclosure provides a system, method, and non-transitory computer readable medium for predicting a mobile user's place when the mobile user is in an indoor space. Technology for tracking the places of mobile users (i.e., users of mobile devices, such as mobile phones, tablet computers, wearable devices, and the like) has improved greatly in recent years. For instance, technology such as global positioning systems (GPS) allows mobile users to be tracked through outdoor locations with high accuracy and low latency.

With the development of indoor positioning technology and the widespread availability of mobile and wearable devices, there has been an explosive growth in the amount of indoor mobile trajectory data. Location prediction can use this indoor mobile trajectory data to infer the location of a user at a given time in the future and to enable flexible applications or services for mobile users. Studies have shown that people typically follow habits when in indoor spaces, making a high percentage of user behavior while indoors predictable.

Knowing the places to be visited by a moving user has useful implications in many application scenarios, such as assisted living, emergency services, smart homes, and augmented reality (AR). For instance, an assisted living application may predict the place where a blind person is expected to go and may guide the blind person to follow the safest path to that place. In a fire emergency, 911 calls may have special access to a caller's latest predicted location and may share that latest predicted position with firefighters so that the firefighters may locate the nearest safe building entry point and locate the caller more quickly. In a smart home, a door can be unlocked automatically and the lights can be turned on when a user is predicted to enter a room, or a smart music system may adjust the volume of music and switch to a different mode to provide a better user experience as the user is predicted to move to another place (e.g., different speakers in different rooms or spaces may be turned off or on to "follow" the user). Other applications may warn a user that the WiFi signal strength is weak in a place the user is predicted to be heading, or may change home phone settings automatically to enhance user privacy (e.g., disable sound notifications) before the user enters a common area in a shared living space. AR applications may perform rendering and other computations before a user reaches a predicted place in order to improve the user experience (e.g., make transitions within the AR environment smoother).

Creating an indoor place prediction system is more complicated than creating an outdoor place prediction system. In an outdoor setting, GPS and similar technology can provide place prediction with high accuracy and low latency. Indoors, however, the decrease in signal strength between the GPS satellite and receiver typically results in a significant decrease in the availability of user position data. Some systems designed specifically to work indoors rely on complex infrastructure that requires pre-defined image tags to be attached to certain known locations in an indoor environment. Other systems rely on multiple ultra-wideband (UWB) anchor nodes having known coordinates, and require the user to carry a UWB tag to communicate with the anchors.

Various forms of wireless fingerprinting and multi-lateration have also been proposed for indoor localization, including techniques that rely on WiFi, frequency modulation (FM) radio, radio frequency identification (RFID), acoustics, global system for mobile (GSM) communications, light, and magnetism. However, these solutions are better suited for localization or tracking rather than place prediction and tend to rely on infrastructure that is costly or difficult to deploy. Such systems are also typically not designed for personalization, which provides at least two benefits in the context of place prediction: (1) allowing individual users to name places in ways that make sense for them (i.e., semantic naming); and (2) improving prediction accuracy based on the different frequently visited places associated with different users. Moreover, these wireless fingerprinting and multi-lateration systems may be capable of collecting and storing users' locations and trajectories on systems that are not under the users' control, thereby compromising user privacy.

Examples of the present disclosure fuse inertial sensor data with WiFi round trip time (RTT) estimated distances in order to predict the indoor places that a mobile user is expected to visit. In one example, the present disclosure uses an off-the-shelf WiFi access point (AP) that supports ranging with RTT (i.e., hardware that may be common in homes, shops, and workplaces) in order to identify the distance from the AP to a mobile user's mobile device. The mobile user's moving trajectory can then be detected by augmenting the WiFi RTT distance measurements with mobile sensor measurements, such as accelerometer and magnetometer data. Although the data collected from such sensors is usually noisy, similar patterns for the sequences of data collected along a trajectory can be detected. Thus, a trajectory can be identified by analyzing the moving orientation of a mobile device in combination with a series of distance measurements from the AP.

In one example, all data collection and processing are performed by the mobile user's mobile device, so that location-based services can be provided without compromising user privacy. In certain instances, predicted places for a mobile user may be shared with other parties (e.g., emergency services personnel) with the mobile user's permission. Further examples of the present disclosure enable personalized place naming. These and other aspects of the present disclosure are discussed in further detail with reference to FIGS. 1-4, below.

To better understand the present disclosure, FIG. 1 illustrates an example system 100 related to the present disclosure. As shown in FIG. 1, the system 100 may comprise a network 116, e.g., a telecommunication service provider network, a core network, or an enterprise network comprising infrastructure for computing and communications services of a business, an educational institution, a governmental service, or other enterprises. The network 116 may be in communication with one or more access networks (e.g., access network 118), other networks 120, and the Internet 122. In one example, network 116 may combine core network components of a cellular network with components of a triple play service network; where triple-play services include telephone services, Internet or data services and television services to subscribers. For example, network 116 may functionally comprise a fixed mobile convergence (FMC) network, e.g., an IP Multimedia Subsystem (IMS) network. In addition, network 116 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 116 may further comprise a broadcast television network, e.g., a traditional cable provider network or an internet Protocol Television (IPTV) network, as well as an Internet Service Provider (ISP) network. In one example, network 116 may include a plurality of television (TV) servers (e.g., a broadcast server, a cable head-end), a plurality of content servers, an advertising server (AS), an interactive TV/video on demand (VoD) server, and so forth.

In one example, the access network 118 may comprise a broadband optical and/or cable access network, a Local Area Network (LAN), a wireless access network (e.g., an IEEE 802.11/Wi-Fi network and the like), a cellular access network, a Digital Subscriber Line (DSL) network, a public switched telephone network (PSTN) access network, a $3^{rd}$ party network, and the like. For example, the operator of network 116 may provide a cable television service, an IPTV service, or any other types of telecommunication service to subscribers via access network 118. In one example, the network 116 may be operated by a telecommunication network service provider. The network 116 and the access network 118 may be operated by different service providers, the same service provider or a combination thereof, or may be operated by entities having core businesses that are not related to telecommunications services, e.g., corporate, governmental or educational institution LANs, and the like. As shown in FIG. 1, the network 116 may also include a plurality of application servers 128 and a database 130. For ease of illustration, various additional elements of core network 116 are omitted from FIG. 1.

In accordance with the present disclosure, network 116 may include a plurality of application servers (AS) 128, each of which may comprise a computing system or server, such as computing system 400 depicted in FIG. 4, and may be configured to provide services to devices in a home network 136, as discussed in further detail below. The network 116 may also include at least one database (DB) 130 that is communicatively coupled to the AS 128. For instance, an AS 128 may provide a streaming media service, such as a streaming video service, and the DB 130 may store audio content (music, podcasts, audiobooks, etc.) that can be accessed via the streaming video service. Alternatively, an AS 128 may provide an immersive gaming service, and the DB 130 may store interactive game objects that can be rendered by the immersive gaming service.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, it should be noted that any number of servers and any number of databases may be deployed in the network 116. Furthermore, these servers and databases may operate in a distributed and/or coordinated manner as a processing system to perform operations in connection with the present disclosure.

Figure 4:
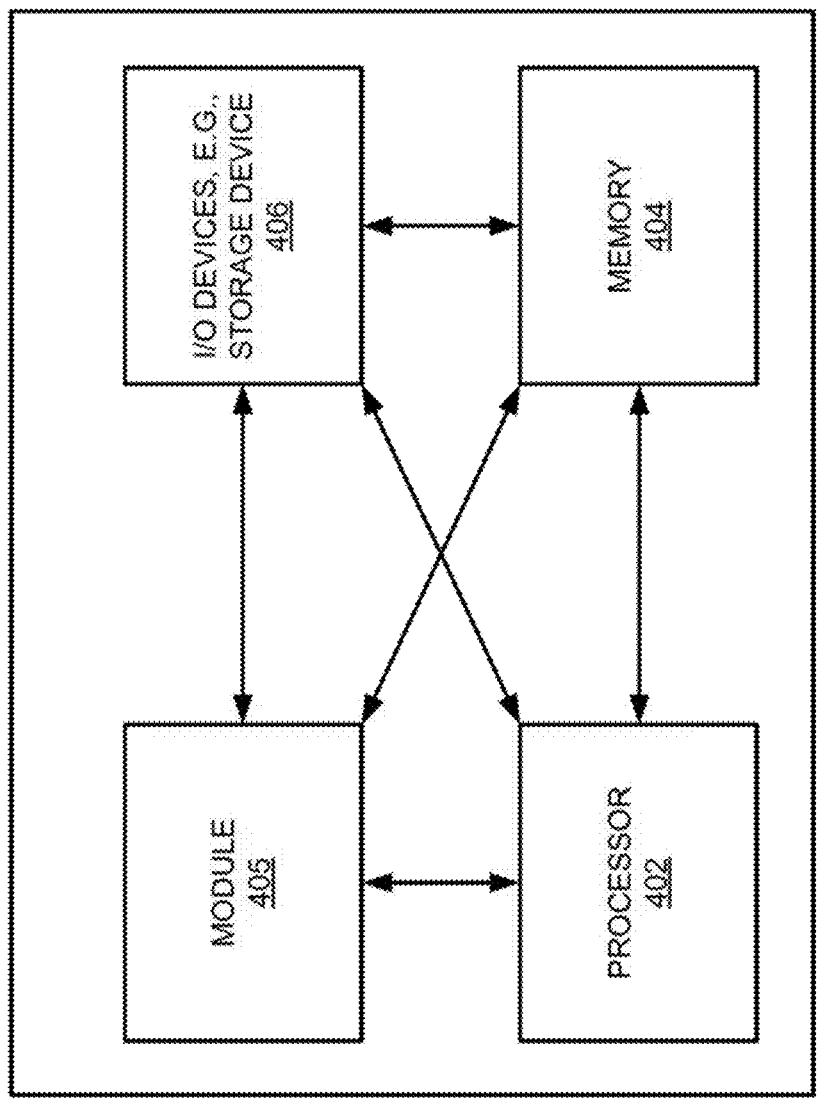
FIG. 4 depicts a high-level block diagram of a computing device specifically programmed to perform the functions described herein.

In one example, access network 118 may include an edge server 112, which may comprise a computing system or server, such as computing system 400 depicted in FIG. 4, and may be configured to provide any of the services provided by any of the application servers 128.

In one example, any of the application servers 128 may comprise a network function virtualization infrastructure (NFVI), e.g., one or more devices or servers that are available as host devices to host virtual machines (VMs), containers, or the like comprising virtual network functions (VNFs). In other words, at least a portion of the network 116 may incorporate software-defined network (SDN) components. Similarly, in one example, access network 118 may comprise an "edge cloud," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 118 comprises a radio access network, the nodes and other components of the access network 118 may be referred to as a mobile edge infrastructure. As just one example, edge server 112 may be instantiated on one or more servers hosting virtualization platforms for managing one or more virtual machines (VMs), containers, microservices, or the like. In other words, in one example, edge server 112 may comprise a VM, a container, or the like.

In one example, home network 136 may include a gateway device 108 (e.g., a residential gateway), which receives streams of data associated with different types of media, e.g., television, phone, and Internet, and separates these communications for the appropriate digital devices to which the gateway device 108 is connected. The streams of data may be received via access network 118, for instance. In one example, television data files are forwarded to a smart television (TV) 104 to be decoded, recorded, and/or displayed. Similarly, Internet communications are sent to and received from gateway device 108, which may be capable of both wired and/or wireless communication. In turn, gateway device 108 receives streams of data from and sends the streams of data to the appropriate devices, e.g., mobile phone 106, personal computer (PC) 110, home phone 114, wearable device 113, IoT device 126, set top box/digital video recorder (STB/DVR) 102, and/or other devices. In one example, gateway device 108 may comprise a wired Ethernet router and/or an Institute for Electrical and Electronics Engineers (IEEE) 802.11 (Wi-Fi) router, and may communicate with respective devices in home network 136 via wired and/or wireless connections. Thus, the gateway device 108 may serve as an access point for devices in the home network 136. It will be appreciated, however, that other types of private networks (e.g., enterprise networks for offices, universities, hospitals, assisted living facilities, and the like) may be configured in a manner similar to the home network 136.

In one example, one or more of the mobile phone 106, wearable device 113, IoT device 126, or other devices in the home network 136 may be configured to perform functions in connection with examples of the present disclosure for predicting a mobile user's place when the mobile user is in an indoor space (where the indoor space may comprise for instance, the home that is served by the home network 136). For instance, the user may carry a mobile device (e.g., mobile phone 106, wearable device 113, or the like) while moving throughout the home that is served by the home network 136. The mobile device may utilize one or more built in sensors (e.g., accelerometer, magnetometer, or the like) to collect data from which the mobile device's orientation can be calculated.

Moreover, the mobile device may communicate with the gateway device 108 in order to determine the mobile device's location within the home that is served by the home network 136. For instance, the mobile device may send requests to the gateway device 108, and the gateway device 108 may respond to the requests. Based upon the round trip time (RTT) for the requests to be sent and the corresponding responses to be received, the mobile device may infer its distance from the gateway device 108 (which has a fixed, known location).

Correlated estimates of orientation and distance may be stored by the mobile device as data blocks. As discussed in further detail below, the mobile device may execute a classifier that takes the data blocks as inputs and generates as outputs identifiers of trajectory segments. Trajectory segments may comprise pieces of the mobile device's trajectory as the user moves throughout the home served by the home network 136. A series of trajectory segment identifiers may then be matched to branches of a prediction tree, where the prediction tree defines a plurality of possible trajectories throughout the home served by the home network 136 (and the places in the home at which those possible trajectories end). Thus, by following the path through the prediction tree that is defined by the series of trajectory segment identifiers, the mobile device is able to infer or predict the place in the home to which the user is going. In some examples, the places in the prediction tree may be associated with semantic names (as opposed to, e.g., coordinates). For instance, in a home, the places at which the possible trajectories end may be identified as "kitchen table," "living room couch," "office desk," and the like. In one example, the semantic names may be assigned by the user, allowing for each user to personalize the semantic names for the places in his or her indoor spaces. It should be noted that a given room may comprise more than one semantically named place (e.g., a kitchen may comprise places including "kitchen table," "refrigerator," "pantry," and the like), as long as the places are separated by a minimum distance (which may be derived from the measurement accuracy of the WiFi RTT distance).

The classifier as well as the prediction tree may be stored locally on the mobile device. In this way, none of the data pertaining to the user's movements or location may be shared with devices other than the mobile device. The predicted place may be used to provide location-based services to the user. For instance, knowing the place to which the user is expected to be going may help the mobile device (or a system controllable by the user device) to improve the user's quality of experience with various services and applications. As an example, the user may be playing music over a network-connected speaker system in his or her home. As the user moves from one room to another, the mobile device may activate different speakers of the network-connected speaker system so that the music "follows" the user. As another example, the user may be using a head mounted display to play a virtual reality game in his or her living room. As the user moves and changes walking direction, the mobile device may instruct the head mounted display to update the virtual objects that are rendered for the user's view. This allows for smoother transitions within the virtual environment, with fewer disruptions or pauses that may detract from the user experience or sense of immersion.

In further examples, the mobile device may, with the user's permission, share the predicted place with other devices or systems (e.g., rather than generating instructions for other devices or systems which might not explicitly reveal the predicted place). For instance, if the user is trapped in an indoor space that has been the location of some sort of disaster (e.g., fire, earthquake, flood, etc.), the processing system may share the predicted place with first responders who are attempting to provide assistance to the user.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 116 is not limited to an IMS network. Similarly, the present disclosure is not limited to an IP/MPLS network for VoIP telephony services, or any particular type of broadcast television network for providing television services, and so forth.

Figure 2:
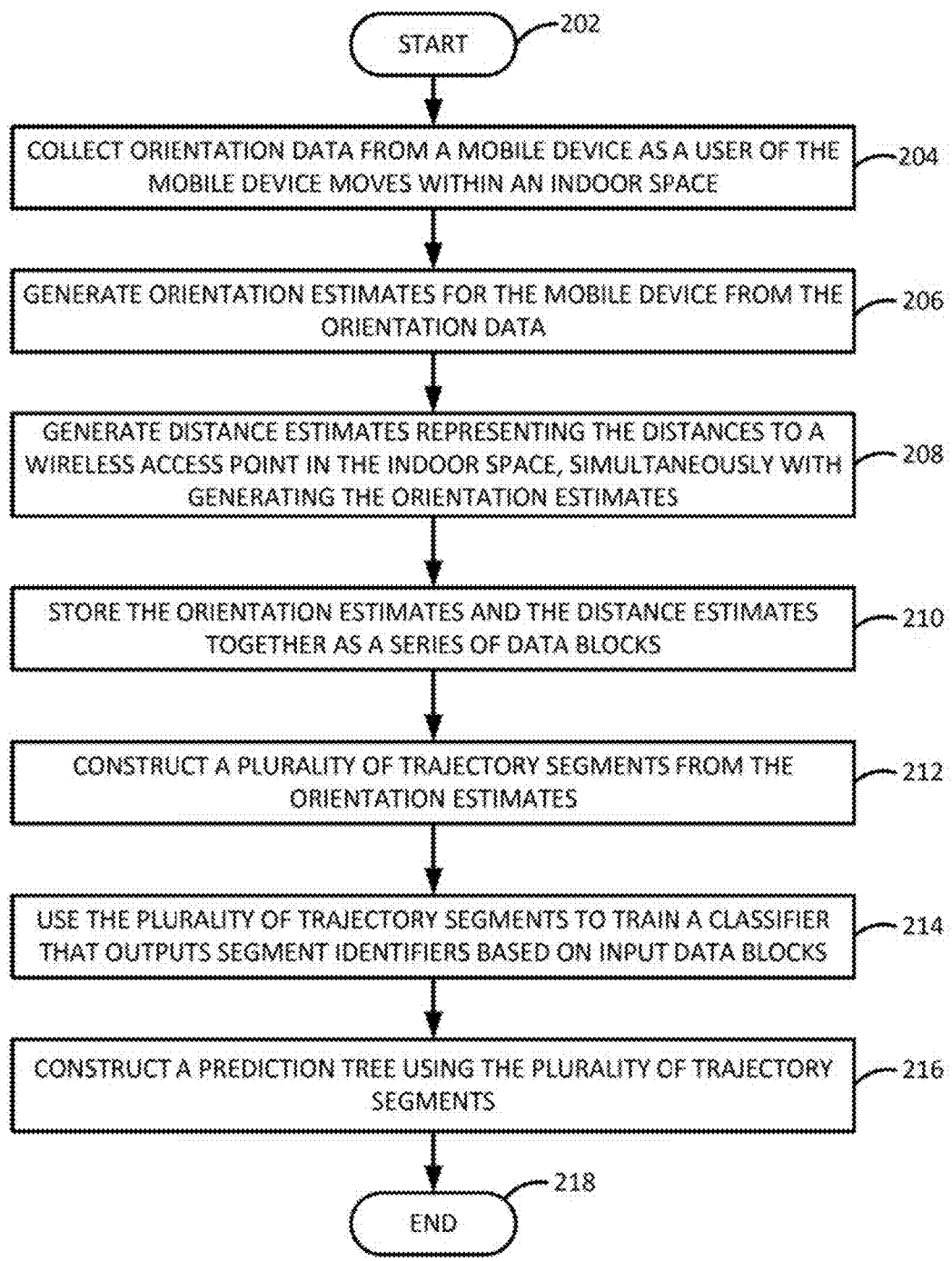
FIG. 2 illustrates a flowchart of an example method for training a mobile device to predict a user's indoor place, according to the present disclosure.

To further aid in understanding the present disclosure, FIG. 2 illustrates a flowchart of an example method 200 for training a mobile device to predict a user's indoor place, according to the present disclosure. In one example, the method 200 may be performed by one of the mobile home network devices illustrated in FIG. 1, such as the mobile phone 106, wearable device 113, or IoT device 126. However, in other examples, the method 200 may be performed by another device, such as the computing system 400 of FIG. 4, discussed in further detail below. For the sake of discussion, the method 200 is described below as being performed by a processing system (where the processing system may comprise a component of the mobile phone 106, wearable device 113, or IoT device 126, the computing system 400, or another device).

The method 200 begins in step 202. In step 204, the processing system may collect orientation data from a mobile device as a user of the mobile device moves within an indoor space.

In one example, the processing system may be the processing system of the mobile device, as discussed above. In one example, the user of the mobile device may pre-select an origin point and a destination point within the indoor space and may identify the origin point and the destination point to the mobile device. In a further example, the user may assign semantic names or labels to the origin point and the destination point when selecting the origin point and the destination point. For instance, the user may assign the semantic name of "kitchen" to the origin point and the semantic name of "living room" to the destination point when the indoor space is the user's home.

The user may then walk from the origin point to the destination point, and the processing system may collect the orientation data while the user is walking from the origin point to the destination point. In one example, the processing system may begin collecting the orientation data in response to receiving a signal from the user (e.g., a press of a button or a verbal statement) indicating that the user is beginning to walk. In another example, the processing system may begin collecting the orientation data in response to automatically detecting a walking event (where the walking event may be automatically detected, for instance, via an activity recognition application programming interface (API) or similar utility of the mobile device).

In one example, the orientation data may be collected directly from sensors of the mobile device. For instance, a gravity vector may be obtained from an accelerometer and/or a magnetic field vector may be obtained from a magnetometer. In one example, the orientation data may be collected at a fixed sampling rate (e.g., every x seconds).

In step 206, the processing system may generate orientation estimates for the mobile device from the orientation data. For instance, in one example the processing system may estimate the orientation of the mobile device by calculating the cross product of the gravity vector obtained from the accelerometer and the magnetic field vector obtained from the magnetometer. The orientation of the mobile device may change over time as the user moves within the indoor space, changes walking direction, and the like. Thus, orientation estimates may be continually generated (e.g., according to the fixed sampling rate at which the orientation data is collected, or according to a different rate).

In step 208, the processing system may generate distance estimates representing the distances of the processing system to a wireless access point in the indoor space, simultaneously with the generating the orientation estimates. In one example, the processing system may estimate the distance to the access point by sending requests to the access point and subsequently measuring the WiFi round trip time (RTT), where the RTT spans the time period beginning with the time at which a request is sent by the processing system and ending with the time at which a response to the request is received by the processing system. As with the orientation of the mobile device, the distance to the access point may change over time as the user moves within the indoor space, changes walking direction, and the like. Thus, distance estimates may be continually generated (e.g., according to the same rate at which the orientation estimates are generated, or according to a different rate).

In step 210, the processing system may store the orientation estimates and the distance estimates together as a series of data blocks. In one example, each data block in the series of data blocks may include at least a timestamp indicating a time at which the data block was collected, a walking direction of the user (e.g., in degrees or other units) at the time indicated by the time stamp, and the WiFi RTT distance (e.g., in millimeters or other units) from the wireless access point to the mobile device at the time indicated by the timestamp.

In one example, the series of data blocks may be stored locally on the mobile device (e.g., in a local memory of the mobile device). In one example, the series of data blocks may be preprocessed prior to being stored to remove noise. For instance, the WiFi RTT measurements may be noisy. Moreover, the errors in the WiFi RTT measurements may not be Gaussian or unimodal, may include outliers, and may be position-dependent. Thus, in one example, the WiFi RTT measurements may be preprocessed by applying a moving average technique to the WiFi RTT measurements to smooth out the short-term fluctuations and outliers.

In one example, each data block or series of related data blocks may be associated with the origin and destination points.

In step 212, the processing system may construct a plurality of trajectory segments from the orientation estimates. Within the context of the present disclosure, a trajectory comprises an ordered sequence of data blocks. A trajectory segment in this context comprises a piece of (e.g., less than all of) the trajectory; in other words, a trajectory may comprise sequence of multiple trajectory segments. In one example, each trajectory segment contains the trajectory data between two change of direction events (i.e., events in which the user's walking direction changes by more than a threshold angle).

For instance, in one example, the processing system may analyze a time series of the orientation data in order to identify points at which the orientation of the mobile device changes. Where the orientation of the mobile device changes, this may indicate that the direction in which the user of the mobile device is walking has changed. In one example, the time series may be analyzed using a change point detection (CPD) algorithm. The CPD algorithm may divide the time series into a plurality of pieces, where each piece of the plurality of pieces may have its own statistical characteristics.

There are multiple ways in which the change points may be detected within the time series. For instance, because a range of values (i.e., angles between zero and three hundred sixty degrees) is already known, and because it is known that humans do not change walking direction with particularly high frequency, the CPD algorithm can simply apply a sliding window to the data points in the time series. Given a sliding window of size w (where w may be equal, for example, to a number of data blocks), the CPD algorithm may compute, for each sliding window, a probability of a change point occurring in the sliding window. Because one fixed-size sliding window may fail to detect some change points (since a smaller sliding window may fail to capture transitions that may take a relatively long time), sliding windows of multiple sizes may be applied to the time series. In one example, the size w of the sliding windows may be between sixty and one hundred eighty data blocks. Then, the CPD algorithm may be executed for each window or varying size to capture both short and long transitions.

In one example, the computation logic for the CPD algorithm may be referred to as a "cost function," and if the cost is determined to exceed a predefined threshold value for a given data point, then the data point may be marked as a change point. The cost function and predefined threshold value in this case may be configurable based on the data and/or requirements of an application. In one example, the cost function may be set equal to the standard deviation of the orientation estimates. The standard deviation values will be low if there is no change in direction and will rise if there is a transition in the time series of the orientation estimates. In one example, when the change in direction of the mobile device is determined to be at least forty-five degrees (which signifies a significant turn), then a new trajectory segment is defined. It is noted that trajectory segments need not be straight, but may be curved as well (as long as no changes in direction within a segment are greater than forty-five degrees), as is natural for human walking.

In one example, once the trajectory segments are initially defined based on the time series of the orientation data, the trajectory segments may be refined. In one example, refining the trajectory segments may involve analyzing the trajectory segments based on duration (e.g., number of data blocks contained within a single trajectory segment) and merging trajectory segments of smaller than a first threshold size (e.g., x data blocks) with a next trajectory segment. In another example, if a trajectory segment has a size that is larger than a second threshold size (e.g., y blocks), then the trajectory segment may be divided into a plurality of equal-sized trajectory segments (where each trajectory segment of the plurality of equal-sized trajectory segments has a size that is no larger than a third threshold size).

Each trajectory segment constructed in step 212 may be assigned a unique identifier, and the sequence of trajectory segments for a given trajectory may be stored (e.g., locally on the mobile device or remotely in a database).

It should be noted that, since many different trajectories may be possible in indoor spaces, some of these trajectories may overlap and share trajectory segments. As such, the same trajectory segment belonging to two different trajectories may not be recognized as the same trajectory segment, and may be identified twice and assigned two different identifiers. This duplicate entry for the same trajectory segment may negatively impact the accuracy of a place prediction. For instance, if the trajectory segment is later recognized as part of a user's movements, the user may be automatically assumed to be heading toward the destination associated with one of the trajectories, without considering the destination associated with the other trajectory. As such, in one example, the processing system may detect duplicate instances of a trajectory segment (i.e., instances of the same trajectory segment belonging to multiple different trajectories) and may ensure that each duplicate instance of a given trajectory segment is assigned the same identifier.

In one example, duplicate instances of a trajectory segment may be detected by identifying very similar trajectory segments that should be considered as the same trajectory segment. During the data collection of steps 204-210, data for each trajectory walked by the user may be collected multiple times. Thus, multiple data points will be available for each trajectory segment walked by the user.

In one example, duplicate trajectory segments are detected by first selecting one sample from each trajectory segment, where a "sample" comprises a sequence of WiFi RTT distance/orientation patterns comprising a whole or less than a whole of a trajectory segment. All other samples are then checked against the selected sample. The complexity of this step may be defined as $O(m^2n^2)$, where m is the number of trajectory segments and n is the number of samples contained in each trajectory segment. The number of segments m will depend upon the size of the indoor space and the number of trajectories walked by the user within the indoor space. The number of samples n is, in one example, a constant, as the user may be asked to collect training data for a fixed number of times for each trajectory.

Two samples are considered to be the same when: (1) the mean orientations of the two samples deviate from each other by no more than a predefined threshold; (2) the directions of change in orientation of the two samples deviate from each other by no more than another predefined threshold; and (3) a similarity score computed for the WiFi RTT distances of the two samples is less than a predefined threshold score. The mean orientations and directions of change in orientation are considered because the trajectory segments from which the samples are taken may not be straight.

The similarity score may, in one example, be computed using a dynamic time warping (DTW) algorithm to measure the similarity on a normalized WiFi RTT distance sequence. In this case, DTW may be used to compare sequences of WiFi RTT distance/orientation patterns with different lengths, by calculating the Euclidean distance between corresponding data blocks. In one example, the comparison may be carried out by building one-to-many and many-to-one matches to create a warping path, such that the total distance between two sequences can be minimized. The similarity score may then be computed as the average distance of the warping path, and two samples may be considered to be the same if the similarity score is less than the predefined threshold score, as discussed above. In one example, the predefined threshold score may be equal to the normalized distance value for the average WiFi RTT error divided by the maximum WiFi RTT distance in the indoor space. The setting of the predefined threshold score in this case assumes that a place within the indoor space is defined generally as a square having all sides equal to the WiFi RTT error. However, the setting of the predefined threshold score can be modified based on other shapes of indoor spaces.

Finally, if at least a predefined threshold percentage (e.g., z percent) of samples for two trajectory segments are determined to be the same according to the above-described comparison, then the two trajectory segments may be considered to be the same and may be assigned the same identifier.

Trajectory segments constructed in accordance with step 212 may comprise training data for training a machine learning model to predict a user's place in an indoor space. In one example, this training data may be augmented with synthetic training data in order to minimize the manual burden of data collection on the user. "Synthetic" training data, in this context, may comprise training data that is simulated rather than observed or explicitly collected.

In one example, synthetic training data may be generated by adding random noise to the data blocks described above. Since both the WiFi RTT distances and the orientation data are noisy to start, including new samples drawn from the domain on existing samples may smooth the structure of the input space. The sequences of WiFi RTT distance/orientation patterns stored in the data blocks may be expanded or shrunk to simulate data blocks generated at different walking speeds. Partial trajectories may also be extracted from existing trajectories and added to the training data to improve segment classification (as described in further detail below) for partial segments (e.g., instances where the user walks part of a trajectory segment).

Referring back to FIG. 2, once the plurality of trajectory segments is constructed, the method 200 may proceed to step 214. In step 214, the processing system may use the plurality of trajectory segments to train a classifier that outputs segment identifiers based on input data blocks.

Trajectory segments that have different WiFi RTT distance trends and different walking direction trends are generally easy to distinguish and identify. However, in some cases, the WiFi RTT distance trends and/or the walking direction trends of two different trajectory segments may be too similar to allow the two different trajectory segments to be easily distinguished. For instance, in one case, two trajectory segments may have the same walking direction trend but different WiFi distance trends (e.g., the trajectory segments may move in the same direction, such as south to north, but may be located different distances from the access point). If the difference between the WiFi distance trends is higher than the typical error of the WiFi RTT ranging, then the classifier should still be able to distinguish between the two trajectory segments.

In another case, the WiFi distance trends of the two trajectory segments may be the same, but the walking direction trends may be different (e.g., the trajectory segments may begin and end at the same distances from the access point, but may move in different directions such as south to north and west to east). However, the difference in walking direction trends should be sufficient for the classifier to distinguish between the two trajectory segments.

In another case, the WiFi distance trends and the walking direction trends may be the same. In this case, the classifier may distinguish between the two trajectory segments by analyzing the other trajectory segments with which the two trajectory segments are connected. For instance, the first trajectory segment may begin five feet to the southwest of the access point and move north ten feet, while the second trajectory segment may begin five feet to the southeast of the access point and move north ten feet. However, the first trajectory segment may be connected to a third trajectory segment that turns east and moves five feet, ending five feet directly north of the access point. The second trajectory segment, by contrast, may be connected to a fourth trajectory segment that turns east and moves five feet, ending approximately eleven feet to the northeast of the access point. In this case, the WiFi distance pattern trends of the third and fourth trajectory segments are different even though the walking direction trends are the same, which allows the classifier to distinguish not only between the third and further trajectory segments, but also between the first and second trajectory segments to which the third and fourth trajectory segments are connected.

In one example, to help distinguish between similar trajectory segments on the basis of connected trajectory segments, the processing system may train two classifiers in step 214 rather than a single classifier. For instance, a first classifier may be trained to classify single trajectory segments (also referred to as "L1 segments"), while a second classifier may be trained to classify two connected trajectory segments (also referred to as "L2 segments").

As discussed above, the input of the classifier may comprise sequences of data blocks associated with trajectory segments. In one example, the classification of sequences of data blocks may be considered to be a multivariate time series classification, which may be solved using a recurrent neural network (RNN) such as gated recurrent units (GRU) network, a long short-term memory (LSTM) network, or a bidirectional LSTM (BiLSTM) network. BiLSTM networks may be especially useful for capturing contextual information, which can help the classifier to perform better (i.e., generate more accurate outputs) and learn faster. BiLSTM can also process data in both the forward and backward directions, and, thus, can learn sequences of data blocks in both directions even when the training data only contains the data for one direction.

In a further example, the classifier comprises a bidirectional long short-term memory network augmented with an attention layer (Attention-BiLSTM). The attention layer may improve the performance of the classifier by focusing on information such as rate of pattern changes. In this case, the output of a BiLSTM layer may be provided as an input to a self-attention layer with sigmoid as an activation function. In one example, a dropout layer may be deployed between the BiLSTM layer and the self-attention layer in order to minimize potential over-fitting problems. The output of the self-attention layer may be input into a dense layer with soft-max as an activation function, so that the final output of the classifier is the probability for each identifier of a plurality of possible identifiers. In one example, to predict a place that is a destination of a trajectory, the trajectory segment having the highest probability may be considered.

In step 216, the processing system may construct a prediction tree using the plurality of trajectory segments. In one example, the prediction tree comprises a plurality of nodes, a plurality of branches, and a plurality of leaves (i.e., nodes without children). Each leaf represents a place in the indoor space, while each branch comprises a trajectory segment of the plurality of trajectory segments. Root and internal nodes of the prediction tree (i.e., nodes having one or more children) do not contain any information, but may be used as points to join trajectory segments. Thus, a complete trajectory within the indoor space may be represented by a path that begins with the root node, ends with a leaf node, and traverses at least one branch (and optionally at least one internal node) in between. In this case a complete trajectory may be defined as a series of connected branches and a leaf. In one example, the processing system may use both L1 and L2 segments to create the branches of the prediction tree. If there are k L1 segments in a trajectory to a place, then there are f(k) paths from the root node to the leaf that represents the place, including identifiers for both the L1 and L2 segments in the prediction tree, where f(k) may be defined as:

$$f(k)=2+f(k-1)+f(k-2), \text{ where } f(1)=1, f(0)=0 \quad \text{(EQN. 1)}$$

The depth of the prediction tree for a given indoor space depends on the maximum number of segments in a trajectory. In one example, if the maximum number of segments is greater than a predefined threshold, the processing system may limit the depth of the prediction tree to a predefined maximum value, $k_{max}$, and analyze only the last $k_{max}$ trajectory segments, since these last $k_{max}$ trajectory segments are most likely to determine the place that is a user's destination.

Storing trajectory data as a prediction tree allows a user's place to be predicted even if the user's point of origin is not the point of origin of a trajectory in the training data. This is because the prediction tree includes paths from any trajectory segment to a destination place (e.g., a leaf). Moreover the prediction tree may help to overcome errors introduced by incorrectly classified trajectory segments. This is because incorrect segment identifiers from the classifier will typically lead to an invalid path in the prediction tree. However it should be noted that, in some cases, an incorrect segment identifier may lead to a valid but incorrect path, which will result in an incorrect place prediction. Storing all possible paths in a prediction tree makes it possible to check multiple options and increases the probabilities of traversals through correct paths that lead to destination places (and, consequently, increases the accuracy of place prediction). Finally, if multiple paths to different places emanate from a common trajectory segment, these multiple paths can be represented in the prediction tree without creating multiple branches (however, multiple subsequent branches may split off from the branch representing the common trajectory segment to continue the multiple paths).

Once the prediction tree has been constructed and stored (e.g., in a local memory of the mobile device or in a remote location accessible by the mobile device), the method 200 may end in step 218. However, at least some steps of the method 200 may be repeated multiple times, in order to obtain multiple trajectories and associated data for training the processing system to predict places in the indoor space to which the user goes.

Figure 3:
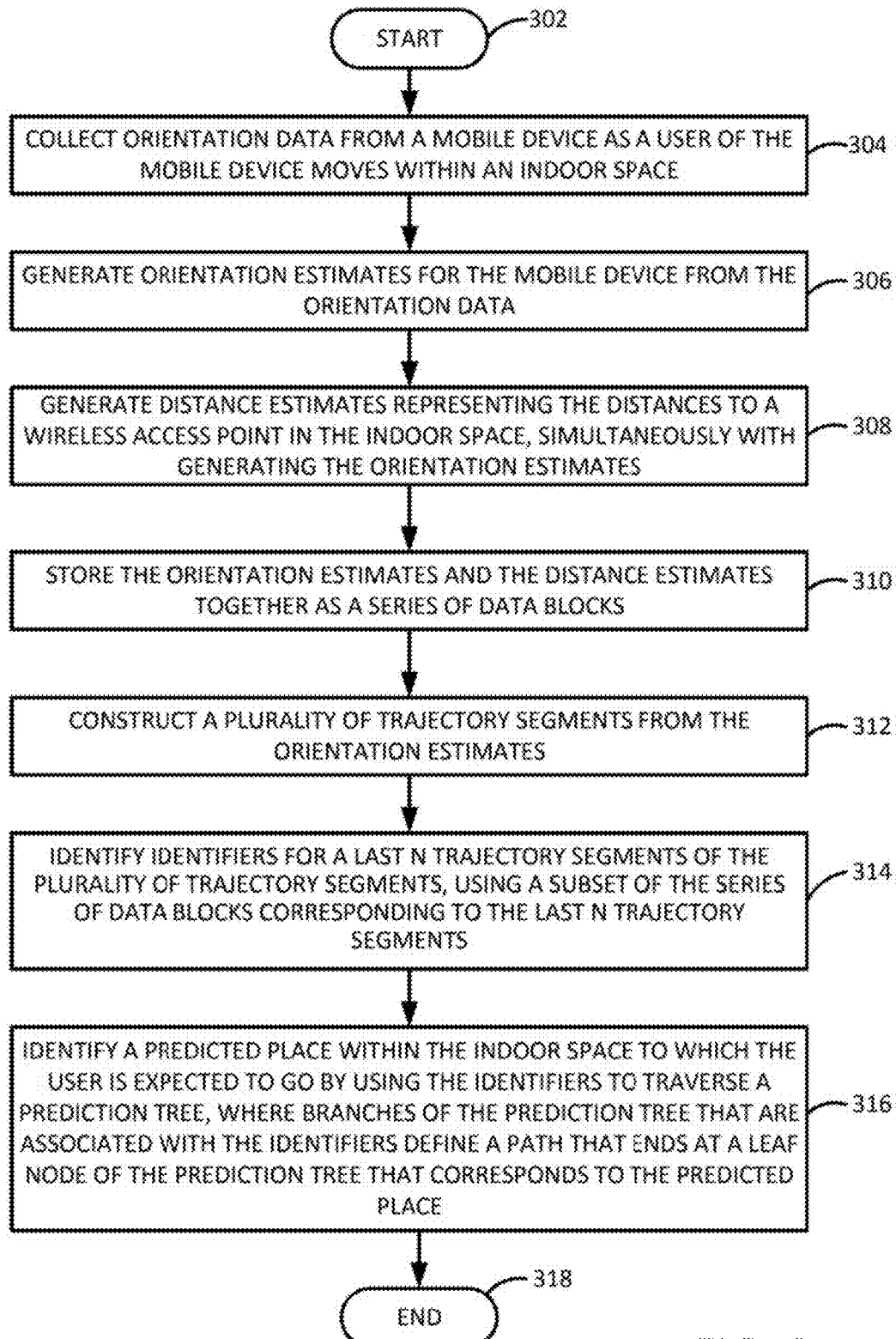
FIG. 3 illustrates a flowchart of an example method for predicting a mobile user's place when the mobile user is in an indoor space, according to the present disclosure.

FIG. 3 illustrates a flowchart of an example method 300 for predicting a mobile user's place when the mobile user is in an indoor space, according to the present disclosure. In one example, the method 300 may be performed by one of the mobile home network devices illustrated in FIG. 1, such as the mobile phone 106, wearable device 113, or IoT device 126. However, in other examples, the method 300 may be performed by another device, such as the computing system 400 of FIG. 4, discussed in further detail below. For the sake of discussion, the method 300 is described below as being performed by a processing system (where the processing system may comprise a component of the mobile phone 106, wearable device 113, or IoT device 126, the computing system 400, or another device).

The method 300 begins in step 302. In step 304, the processing system may collect orientation data from a mobile device as a user of the mobile device moves within an indoor space.

In one example, the processing system may be the processing system of the mobile device, as discussed above. The user may move (e.g., walk or ride in a wheelchair or an electric scooter) from an origin point to an unknown destination point, and the processing system may collect the orientation data while the user is moving from the origin point to the destination point. In one example, the processing system may begin collecting the orientation data in response to receiving a signal from the user (e.g., a press of a button or a verbal statement) indicating that the user is beginning to move. In another example, the processing system may begin collecting the orientation data in response to automatically detecting a moving event, e.g., a walking event (where the walking event may be automatically detected, for instance, via an activity recognition application programming interface (API) or similar utility of the mobile device).

In one example, the orientation data may be collected directly from sensors of the mobile device. For instance, a gravity vector may be obtained from an accelerometer and/or a magnetic field vector may be obtained from a magnetometer. In one example, the orientation data may be collected at a fixed sampling rate (e.g., every x seconds).

In step 306, the processing system may generate orientation estimates for the mobile device from the orientation data. For instance, in one example the processing system may estimate the orientation of the mobile device by calculating the cross product of the gravity vector obtained from the accelerometer and the magnetic field vector obtained from the magnetometer. The orientation of the mobile device may change over time as the user moves within the indoor space, changes moving direction, and the like. Thus, orientation estimates may be continually generated (e.g., according to the fixed sampling rate at which the orientation data is collected, or according to a different rate).

In step 308, the processing system may generate distance estimates representing the distances of the processing system to a wireless access point in the indoor space, simultaneously with the generating the orientation estimates. In one example, the processing system may estimate the distance to the access point by sending requests to the access point and subsequently measuring the WiFi round trip time (RTT), where the RTT spans the time period beginning with the time at which a request is sent by the processing system and ending with the time at which a response to the request is received by the processing system. As with the orientation of the mobile device, the distance to the access point may change over time as the user moves within the indoor space, changes moving direction, and the like. Thus, distance estimates may be continually generated (e.g., according to the same rate at which the orientation estimates are generated, or according to a different rate).

In step 310, the processing system may store the orientation estimates and the distance estimates together as a series of data blocks. In one example, each data block in the series of data blocks may include at least a timestamp indicating a time at which the data block was collected, a moving direction of the user (e.g., in degrees) at the time indicated by the time stamp, and the WiFi RTT distance (e.g., in millimeters) from the wireless access point to the mobile device at the time indicated by the timestamp.

In one example, the series of data blocks may be stored locally on the mobile device (e.g., in a local memory of the mobile device). In one example, the series of data blocks may be preprocessed prior to being stored to remove noise. For instance, the WiFi RTT measurements may be noisy. Moreover, the errors in the WiFi RTT measurements may not be Gaussian or unimodal, may include outliers, and may be position-dependent. Thus, in one example, the WiFi RTT measurements may be preprocessed by applying a moving average technique to the WiFi RTT measurements to smooth out the short-term fluctuations and outliers.

In step 312, the processing system may construct a plurality of trajectory segments from the orientation estimates. For instance, in one example, the processing system may analyze a time series of the orientation data in order to identify points at which the orientation of the mobile device changes. Where the orientation of the mobile device changes, this may indicate that the direction in which the user of the mobile device is moving has changed. In one example, the time series may be analyzed using a CPD algorithm. The CPD algorithm may divide the time series into a plurality of pieces, where each piece of the plurality of pieces may have its own statistical characteristics.

In one example, once the trajectory segments are initially defined based on the time series of the orientation data, the trajectory segments may be refined. In one example, refining the trajectory segments may involve analyzing the trajectory segments based on duration (e.g., number of data blocks contained within a single trajectory segment) and merging trajectory segments of smaller than a first threshold size (e.g., x data blocks) with a next trajectory segment. In another example, if a trajectory segment has a size that is larger than a second threshold size (e.g., y blocks), then the trajectory segment may be divided into a plurality of equal-sized trajectory segments (where each trajectory segment of the plurality of equal-sized trajectory segments has a size that is no larger than a third threshold size).

In step 314, the processing system may identify identifiers for the last n trajectory segments of the plurality of trajectory segments, using a subset of the series of data blocks corresponding to the last n trajectory segments.

In one example, n is a number that is fewer than the total number of the plurality of trajectory segments. In one example, the identifiers for the last n trajectory segments are identified by inputting the data blocks corresponding to the n trajectory segments to a classifier that is trained to output identifiers based on the data blocks.

In one example, the classifier may comprise two classifiers: (1) a first classifier trained to classify single trajectory segments (L1 segments), and (2) a second classifier trained to classify two connected trajectory segments (L2 segments). In one example, either or both classifiers may comprise a recurrent neural network (RNN) such as gated recurrent units (GRU) network, a long short-term memory (LSTM) network, or a bidirectional LSTM (BiLSTM) network. In a further example, the classifier comprises a bidirectional long short-term memory network augmented with an attention layer (Attention-BiLSTM). In this case, the output of a BiLSTM layer may be provided as an input to a self-attention layer with sigmoid as an activation function. In one example, a dropout layer may be deployed between the BiLSTM layer and the self-attention layer in order to minimize potential over-fitting problems. The output of the self-attention layer may be input into a dense layer with soft-max as an activation function, so that the final output of the classifier is the probability for each identifier of a plurality of possible identifiers.

In step 316, the processing system may identify a predicted place within the indoor space to which the user is expected to go by using the identifiers to traverse a prediction tree, where branches of the prediction tree that are associated with the identifiers define a path that ends at a leaf node of the prediction tree that corresponds to the predicted place. For instance, as discussed in connection with the method 200, each identifier of the identifiers may correspond to a branch of the prediction tree, where the prediction tree defines a plurality of different paths to a plurality of different locations within the indoor space. By following the path defined by these branches, the processing system may be able to identify a leaf node at which the path ends. The place associated with the leaf node may be inferred to be a place to which the user is heading.

In one example, multiple places may be predicted. In this case, weights may be assigned to predicted places by counting the number of possible paths that lead to each predicted place, following a predicted series of trajectory segments, and assigning higher weights to longer paths through the prediction tree and to paths including L2 trajectory segments. For instance, if there are p possible predicted places, the weight for each predicted place may be assigned according to:

$$\text{weights}[sp] = \Sigma_{i=1}^{r}(n1_i + 2*n2_i) \quad \text{(EQN. 2)}$$

where r is the number of paths that lead to place sp, and $n1_i$ and $n2_i$ are the numbers of L1 trajectory segments and L2 trajectory segments, respectively, in each path. The p possible places may then be sorted by weight values, and the top m places may be output as predicted places.

The predicted place may be used to provide location-based services to the user. For instance, knowing the place to which the user is expected to be going may help the mobile device (or a system controllable by the user device) to improve the user's quality of experience with various services and applications. As an example, the user may be playing music over a network-connected speaker system in his or her home. As the user moves from one room to another, the mobile device may activate different speakers of the network-connected speaker system so that the music "follows" the user. As another example, the user may be using a head mounted display to play a virtual reality game in his or her living room. As the user moves and changes direction, the mobile device may instruct the head mounted display to update the virtual objects that are rendered for the user's view. This allows for smoother transitions within the virtual environment, with fewer disruptions or pauses that may detract from the user experience or sense of immersion.

In further examples, the mobile device may, with the user's permission, share the predicted place with other devices or systems (e.g., rather than generating instructions for other devices or systems which might not explicitly reveal the predicted place). For instance, if the user is trapped in an indoor space that has been the location of some sort of disaster (e.g., fire, earthquake, flood, etc.), the processing system may share the predicted place with first responders who are attempting to provide assistance to the user. In step 318, the method 300 may end.

Although not expressly specified above, one or more steps of the method 200 or 300 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or 3 that recite a determining operation or involve a decision do not necessarily require that both branches of the determining operation be practiced. In other words, one of the branches of the determining operation can be deemed as an optional step. Furthermore, operations, steps or blocks of the above-described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the methods 200 or 300 may be implemented as the system 400. For instance, any one of the mobile home network devices illustrated in FIG. 1 that could be used to perform the method 200 or the method 300, such as the mobile phone 106, wearable device 113, or IoT device 126, could be implemented as illustrated in FIG. 4. In another example, any of the user endpoint devices of FIG. 1 could be implemented as illustrated in FIG. 4.

As depicted in FIG. 4, the system 400 comprises a hardware processor element 402, a memory 404, a module 405 for predicting a mobile user's place when the mobile user is in an indoor space, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for predicting a mobile user's place when the mobile user is in an indoor space may include circuitry and/or logic for performing special purpose functions relating to locally managing quality of experience in a home network. The input/output devices 406 may include, for example, storage devices (including but not limited to, a tape drive, a floppy drive, a hard disk drive or a compact disk drive), a receiver, a transmitter, a fiber optic communications line, an output port, an accelerometer, a magnetometer, or a user input device (such as a keyboard, a keypad, a mouse, and the like).

Although only one processor element is shown, it should be noted that the specific-purpose computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a specific purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for predicting a mobile user's place when the mobile user is in an indoor space (e.g., a software program comprising computer-executable instructions) can be loaded into memory 404 and executed by hardware processor element 402 to implement the steps, functions or operations as discussed above in connection with the example methods 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for predicting a mobile user's place when the mobile user is in an indoor space (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
    collecting, by a processing system including at least one processor, orientation data from a mobile device as a user of the mobile device moves within an indoor space;
    generating, by the processing system, orientation estimates for the mobile device from the orientation data;
    generating, by the processing system, distance estimates representing distances of the mobile device to a wireless access point in the indoor space, simultaneously with the generating the orientation estimates;
    storing, by the processing system, the orientation estimates and the distance estimates together as a series of data blocks;
    constructing, by the processing system, a plurality of trajectory segments from the orientation estimates;
    identifying, by the processing system, identifiers for a last number of trajectory segments of the plurality of trajectory segments, using a subset of the series of data blocks corresponding to the last number of trajectory segments, wherein the identifying the identifiers comprises inputting data blocks of the series of data blocks corresponding to the last number of trajectory segments to a classifier that is trained to output the identifiers based on the data blocks that are inputted; and
    identifying, by the processing system, a predicted place within the indoor space to which the user is expected to go by using the identifiers to traverse a prediction tree, where branches of the prediction tree that are associated with the identifiers define a path that ends at a leaf node of the prediction tree that corresponds to the predicted place.

2. The method of claim 1, wherein processing system is part of the mobile device.

3. The method of claim 1, wherein the orientation data comprises sensor data collected from at least one of: an accelerometer of the mobile device or a magnetometer of the mobile device.

4. The method of claim 3, wherein each orientation estimate of the orientation estimates is generated by calculating a cross product of a gravity vector obtained from the accelerometer and a magnetic field vector obtained from the magnetometer.

5. The method of claim 1, wherein each distance estimate of the distance estimates is generated based on a round trip time for the mobile device to send a request to the wireless access point and to receive a response to the request from the wireless access point.

6. The method of claim 5, wherein a location of the wireless access point within the indoor space is known and fixed.

7. The method of claim 1, wherein the series of data blocks is stored locally on the mobile device.

8. The method of claim 1, wherein the constructing comprises analyzing a time series of the orientation estimates in order to identify points at which an orientation of the mobile device changes, wherein changes in the orientation of the mobile device as inferred to indicate that a direction in which the user is moving has changed.

9. The method of claim 8, wherein the time series is analyzed using a change point detection algorithm.

10. The method of claim 1, wherein the last number is a number that is fewer than a total number of the plurality of trajectory segments.

11. The method of claim 1, wherein the classifier comprises a recurrent neural network.

12. The method of claim 11, wherein the recurrent neural network comprises at least one of: a gated recurrent units network, a long short-term memory network, or a bidirectional long short-term memory network.

13. The method of claim 12, wherein the bidirectional long short-term memory network is augmented with an attention layer, and wherein an output of a bidirectional long short-term memory network layer of the classifier is provided as an input to the attention layer.

14. The method of claim 13, wherein sigmoid is an activation function of the attention layer.

15. The method of claim 13, wherein a dropout layer is deployed between the bidirectional long short-term memory network layer and the attention layer.

16. The method of claim 13, wherein an output of the attention layer is input into a dense layer of the classifier with soft-max as an activation function.

17. The method of claim 16, wherein an output of the dense layer is a probability for each identifier of the identifiers.

18. A non-transitory computer-readable medium storing instructions which, when executed by a processing system including at least one processor, cause the processing system to perform operations, the operations comprising:
    collecting orientation data from a mobile device as a user of the mobile device moves within an indoor space;
    generating orientation estimates for the mobile device from the orientation data;
    generating distance estimates representing distances of the mobile device to a wireless access point in the indoor space, simultaneously with the generating the orientation estimates;
    storing the orientation estimates and the distance estimates together as a series of data blocks;
    constructing a plurality of trajectory segments from the orientation estimates;
    identifying identifiers for a last number of trajectory segments of the plurality of trajectory segments, using a subset of the series of data blocks corresponding to the last number of trajectory segments, wherein the identifying the identifiers comprises inputting data blocks of the series of data blocks corresponding to the last number of trajectory segments to a classifier that is trained to output the identifiers based on the data blocks that are inputted; and identifying a predicted place within the indoor space to which the user is expected to go by using the identifiers to traverse a prediction tree, where branches of the prediction tree that are associated with the identifiers define a path that ends at a leaf node of the prediction tree that corresponds to the predicted place.

19. The non-transitory computer-readable medium of claim 18, wherein processing system is part of the mobile device.

20. A system comprising:

a processing system including at least one processor; and a non-transitory computer-readable medium storing instructions which, when executed by the processing system, cause the processing system to perform operations, the operations comprising:

collecting orientation data from a mobile device as a user of the mobile device moves within an indoor space;

generating orientation estimates for the mobile device from the orientation data;

generating distance estimates representing distances of the mobile device to a wireless access point in the indoor space, simultaneously with the generating the orientation estimates;

storing the orientation estimates and the distance estimates together as a series of data blocks;

constructing a plurality of trajectory segments from the orientation estimates;

identifying identifiers for a last number of trajectory segments of the plurality of trajectory segments, using a subset of the series of data blocks corresponding to the last number of trajectory segments, wherein the identifying the identifiers comprises inputting data blocks of the series of data blocks corresponding to the last number of trajectory segments to a classifier that is trained to output the identifiers based on the data blocks that are inputted; and identifying a predicted place within the indoor space to which the user is expected to go by using the identifiers to traverse a prediction tree, where branches of the prediction tree that are associated with the identifiers define a path that ends at a leaf node of the prediction tree that corresponds to the predicted place.

* * * * *

UNITED STATES PATENT AND TRADEMARK OFFICE
CERTIFICATE OF CORRECTION

| | | |
|---|---|---|
| PATENT NO. | : 12,452,828 B2 | Page 1 of 1 |
| APPLICATION NO. | : 18/046129 | |
| DATED | : October 21, 2025 | |
| INVENTOR(S) | : Manoop Talasila et al. | |

It is certified that error appears in the above-identified patent and that said Letters Patent is hereby corrected as shown below:

On the Title Page

Item (71), Applicants, Line 2, change "Atlanta, NJ" to --Atlanta, GA--

Signed and Sealed this
Eighteenth Day of November, 2025

John A. Squires
*Director of the United States Patent and Trademark Office*